United States Patent [19]

Utsumi

[11] Patent Number: 4,701,617
[45] Date of Patent: Oct. 20, 1987

[54] STIMULABLE PHOSPHOR SHEET CONVEYANCE APPARATUS

[75] Inventor: Isao Utsumi, Kanagawa, Japan

[73] Assignee: Fuji Photo Film Co., Ltd., Japan

[21] Appl. No.: 788,449

[22] Filed: Oct. 17, 1985

[30] Foreign Application Priority Data

Oct. 20, 1984 [JP] Japan .................. 59-220740

[51] Int. Cl.$^4$ .................. B65H 5/00; G01T 1/105
[52] U.S. Cl. .................. 250/327.2; 250/484.1; 271/225; 271/902
[58] Field of Search .................. 250/327.2, 337, 484.1; 378/172, 173, 174, 181; 271/225, DIG. 902, 291, 186

[56] References Cited

U.S. PATENT DOCUMENTS

| | | | |
|---|---|---|---|
| 3,885,664 | 5/1975 | Fujimura | 198/572 |
| 3,948,505 | 4/1976 | Miller et al. | 271/303 |
| 4,214,740 | 7/1980 | Acquaviva | 271/3 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,603,253 | 7/1986 | Nakagawa | 250/327.2 |

FOREIGN PATENT DOCUMENTS 11395 2/1981 Japan .................. 250/327.2
12599 2/1981 Japan .

Primary Examiner—Janice A. Howell
Assistant Examiner—Constantine Hannaher
Attorney, Agent, or Firm—Gerald J. Ferguson, Jr.; Michael P. Hoffman; Michael J. Foycik

[57] ABSTRACT

A stimulable phosphor sheet conveyance apparatus has a first conveyance path for receiving a stimulable phosphor sheet from an image read-out section and conveying it in the forward direction, a third conveyance path for receiving the stimulable phosphor sheet from the first conveyance path and then conveying it in the reverse direction, a second conveyance path for receiving the stimulable phosphor sheet conveyed from the third conveyance path, conveying it to an erasing section with its side for recording an image facing erasing light sources in the erasing section, and, after the stimulable phosphor sheet has been erased, conveying the stimulable phosphor sheet in the forward direction to return it to the third conveyance path. A roller for conveying the stimulable phosphor sheet is positioned at the branching point between the first and second conveyance paths, the third conveyance path is provided with a belt for guiding the stimulable phosphor sheet received from the first conveyance path to the third conveyance path, and the third conveyance path is positioned to lie on an imaginary extension of the second conveyance path.

8 Claims, 7 Drawing Figures

STIMULABLE PHOSPHOR SHEET CONVEYANCE APPARATUS

BACKGROUND OF THE INVENTION

1. Field of the Invention

This invention relates to a stimulable phosphor sheet conveyance apparatus for a system in which stimulable phosphor sheets are exposed to a radiation passing through an object to have a radiation image stored thereon, the stimulable phosphor sheets are exposed to stimulating rays which cause them to emit light in proportion to the stored radiation energy, the emitted light is detected and converted into electric image signals which are used to reproduce a visible image from the read-out image information, the stimulable phosphor sheets are exposed to erasing light for releasing radiation energy remaining thereon after read-out, and the erased stimulable phosphor sheets are reused for recording radiation images. This invention particularly relates to a stimulable phosphor sheet conveyance apparatus for conveying stimulable phosphor sheets into and out of an erasing section of such a system.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed for example in Japanese Unexamined Patent Publication No. 56(1981)-11395 and U.S. Pat. Nos. 4,258,264, 4,315,318, 4,387,428 and 4,276,473, it has been proposed to use a stimulable phosphor in a radiation image recording and reproducing system. Specifically, a sheet comprising the stimulable phosphor (hereinafter referred to as a stimulable phosphor sheet) is first exposed to a radiation passing through an object such as a part of the human body to have a radiation image stored thereon, and is scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed so as to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used only for temporarily storing the radiation image in order to reproduce the final visible image therefrom in a final recording medium. For economical reasons, therefore, it is desirable that the stimulable phosphor sheets be used repeatedly.

In order to reuse stimulable phosphor sheets as described above, the radiation energy remaining on the stimulable phosphor sheet after it is scanned with stimulating rays to read out the radiation image stored thereon should be erased as described, for example, in Japanese Unexamined Patent Publication No. 56(1981)-12599 and U.S. Pat. No. 4,470,619. The stimulable phosphor sheet can then be used again for radiation image recording.

For enabling the aforesaid radiation image recording and read-out method to be carried out at high efficiency using compact equipment, it is advisable for the read-out of the image information from the stimulable phosphor sheets carrying the radiation image of the object stored thereon and the erasure of the radiation energy remaining on the stimulable phosphor sheets after read-out to be carried out consecutively in a continuous operation in one and the same apparatus. When stimulable phosphor sheets recorded with radiation images are loaded into such an apparatus integrally combining a read-out section and an erasing section, they are first subjected to read-out of the stored image information in the read-out section and then immediately subjected to erasure of the remaining radiation energy in the erasing section, whereafter they are discharged from the apparatus in a state reusable for the recording of radiation images thereon. Further, if a radiation image recording section is also built into the aforesaid integrated apparatus, it becomes possible to carry out image recording, image read-out and the erasure of the remaining radiation energy consecutively in a single apparatus.

The apparatus integrating the read-out and erasing sections or integrating these sections together with the recording section should be fabricated as compactly as possible. It is therefore preferable to position the read-out and erasing sections one above the other and to convey the read-out sheets from the read-out section to the erasing section by a conveyance means employing belts or the like. In this case, however, if the stimulable phosphor sheets are simply conveyed from the read-out section to the erasing section by an ordinary belt, the surface of the sheets for the recording of radiation images (hereinafter referred to as the stimulable phosphor side) will face in opposite directions in the read-out and erasing sections. More specifically, if the stimulable phosphor side of a sheet faces upward in the read-out section, it will face downward when the sheet arrives at the erasing section. As a result, in order to expose the stimulable phosphor sheets to erasing light, it becomes necessary to make the conveyor belt and other components of the conveyance means in the erasing section from transparent materials and to provide the erasing light sources below the conveyance means. This is undesirable from the point of erasing efficiency and the like.

To overcome this problem without having to turn the stimulable phosphor sheet over after it arrives at the erasing section, it is general practice to provide a switchback mechanism for once reversing the direction of travel of the sheet as it is conveyed between the read-out section and the erasing section and a guide plate whose operation is interlinked with that of the switchback mechanism so as to change the course along which the sheet is conveyed. However, this solution is disadvantageous in that the need to provide the guide plate interlinked with the switchback mechanism complicates the structure of the apparatus and results in higher fabrication cost, and also in that the guide plate is apt to scratch the stimulable phosphor side of the sheets, which is a particularly fatal defect in a system that repeatedly reuses the stimulable phosphor sheets and that carries out read-out of the image information from the stimulable phosphor sheets by scanning their stimulable phosphor sides with stimulating rays.

SUMMARY OF THE INVENTION

The primary object of the present invention is to provide a stimulable phosphor sheet conveyance apparatus for conveying stimulable phophor sheets from a read-out section to an erasing section without turning the sheets upside down. Another object of the present invention is to provide such a stimulable sheet conveyance appartus which enables switchback conveyance of stimulable phosphor sheets solely through the operation of conveyor belts and rollers, without need for guide plates or other members which would complicate the structure of the apparatus.

The present invention provides a stimulable phosphor sheet conveyance apparatus having a first conveyance path for receiving a stimulable phosphor sheet subjected to image read-out in an image read-out section and conveying the stimulable phosphor sheet in the forward direction; a third conveyance path for receiving the stimulable phosphor sheet conveyed by said first conveyance path and then conveying it in the reverse direction; a second conveyance path for receiving the stimulable phosphor sheet conveyed in the reverse direction by the third conveyance path, conveying the stimulable phosphor sheet in the same direction to an erasing section in such orientation that the stimulable phosphor side of the stimulable phosphor sheet faces erasing light sources provided in the erasing section, and, after the radiation energy remaining on the stimulable phosphor sheet has been released in said erasing section, conveying the stimulable phosphor sheet in the forward direction to return it to the third conveyance path; wherein the improvement comprises positioning a roller for conveying the stimulable phosphor sheet at the branching point between the first conveyance path and the second conveyance path, providing the third conveyance path with a belt for guiding the stimulable phosphor sheet received from the first conveyance path to the third conveyance path, and positioning the third conveyance path to lie approximately on an imaginary straight-line extension of the second conveyance path.

In accordance with the stimulable phosphor conveyance apparatus of the present invention, since the stimulable phosphor sheet subjected to read-out is conveyed from the first conveyance path to the third conveyance path, next conveyed in the reverse direction along the third conveyance path so as to enter the second conveyance path positioned approximately on an imaginary straight-line extension thereof, and then conveyed to the erasing section along the second conveyance path, it is possible to convey the stimulable phosphor sheet into the erasing section so that its stimulable phosphor side will face erasing light sources provided in the erasing section. Then, after erasing of the sheet is finished in the erasing section, the sheet can be conveyed out of the erasing section by conveying it in the reverse direction along the second conveyance path and feeding it into the third conveyance path.

As the sheet conveyed along the first conveyance path is drawn into the third conveyance path by a belt defining one side of the third conveyance path and is guided by the rotation of a roller provided at the branching point between the first and second conveyance paths so as to pass smoothly from the third conveyance path to the second conveyance path, it is possible to convey the stimulable phosphor sheet into the erasing section in such orientation that its stimulable phosphor side faces the erasing light sources in the erasing section merely by controlling the conveyance of the sheet along the aforesaid conveyance paths. The stimulable phosphor sheet conveyance apparatus according to this invention therefore has no need for the guide plate required in conventional conveyance apparatuses for changing the course of sheet travel. As a result, the stimulable sheet conveyance apparatus according to this invention eliminates the possibility of the stimulable phosphor sheets being scratched by a guide plate, makes it possible to simplify the structure of the conveyance apparatus and thus to reduce the fabrication cost thereof, and enhances the reliability of sheet conveyance.

DESCRIPTION OF THE PREFERRED EMBODIMENTS

Figure 1:
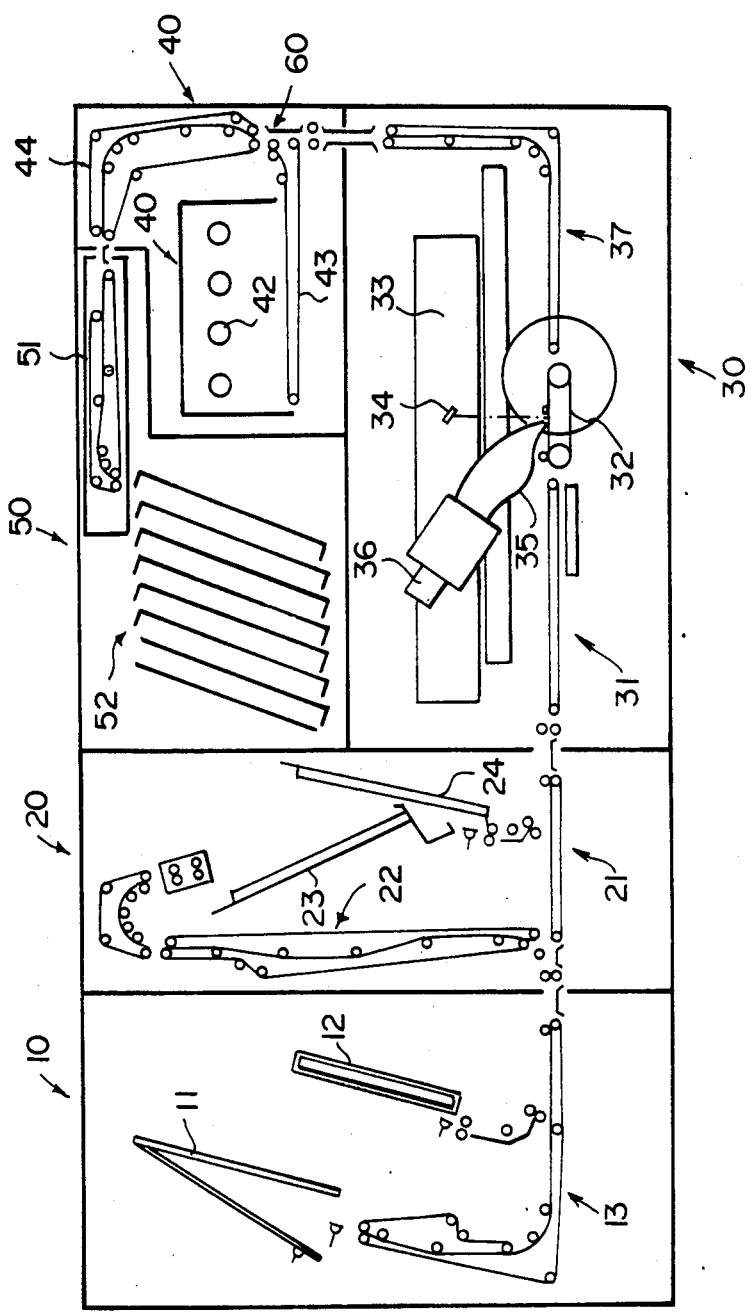
FIG. 1 is a schematic side view showing a radiation image read-out and erasing apparatus employing an embodiment of the conveyance apparatus according to this invention.

FIG. 1 schematically illustrates a radiation image read-out and erasing apparatus which is provided with a stimulable phosphor sheet conveyance apparatus according to the present invention. The radiation image read-out and erasing apparatus consists of a receiving section 10 for receiving cassettes 11 and/or magazines 12 containing stimulable phosphor sheets having radiation images stored thereon and for removing the stimulable phosphor sheets from the cassettes and magazines, a stock section 20 for temporarily storing the stimulable phosphor sheets, a read-out section 30 for scanning the stimulable phosphor sheets with stimulating rays and photoelectrically detecting the light emitted from the stimulable phosphor sheets scanned with said stimulating rays, an erasing section 40 for exposing the stimulable phosphor sheets to erasing light to release the radiation energy remaining thereon after read-out, and a sorter section 50 for sorting the erased sheets by size prior to reuse.

The stimulable phosphor sheets successively removed from the cassettes 11 and/or magazines 12 in the receiving section 10 are conveyed out of the receiving section 10 by a first conveyor 13 comprised of belts and rollers. When the rate at which the stimulable phosphor sheets are fed out by the receiving section 10 is the same as or slower than the read-out speed of the read-out section 30, the sheets are sent directly to the read-out section 30 by the first conveyor 13 and a second conveyor 21. On the other hand, when the rate at which the stimulable phosphor sheets are fed from the receiving section 10 is faster than they can be read out in the read-out section 30, the sheets are temporarily stored in the stock section 20 and fed out therefrom in the order received and at a rate matched to the read-out speed of the read-out section 30. More specifically, the sheets are fed from the first conveyor 13 to a third conveyor 22 located in the stock section 20 and then to a first stock shelf 23. When a prescribed number of sheets have accumulated on the first stock shelf 23, they are transferred to a second stock shelf 24 and from here are conveyed to the read-out section 30 one by one starting with the topmost. At this time, since the sheets are stacked on the first stock shelf 23 in the order received so that the first received sheet is at the bottom and the stack of sheets is transferred to the second stock shelf 24 in such manner that this bottom sheet becomes the top sheet, the sheets can be conveyed out of the stock section 20 in the order that they were received by the receiving section 10.

The sheets leaving the stock section 20 are conveyed to an endless belt mechanism 32 by a fourth conveyor 31. Upon being fed onto the endless belt mechanism 32, the stimulable phosphor sheet is scanned in the main scanning direction, i.e. the direction perpendicular to the conveying direction of the endless belt mechanism 32 (the direction perpendicular to the drawing sheet), by stimulating rays emitted by a laser beam source 33 and deflected by a galvanometer mirror 34, and at the same time is scanned in the sub-scanning direction approximately mormal to the main scanning direction as a result of being conveyed by the endless belt mechanism 32. When scanned by the stimulating rays, the stimulable phosphor sheet emits light in proportion to the radiation image information stored thereon. The emitted light is picked up by a light guide member 35 and transmitted to a photomultiplier 36 which photoelectrically converts it into an electric image signal corresponding to the read-out image information. After read-out is finished, the stimulable phosphor sheet is conveyed to the erasing section 40 via a fifth conveyor 37 and a switchback conveyance device 60.

After the switchback conveyance device 60 has received the stimulable phosphor sheet from the fifth conveyor 37, it feeds the sheet onto a belt 43 in such manner that the stimulable phosphor side thereof faces upward. The belt 43 then carries the sheet into the erasing section 40 where the radiation energy remaining on the sheet is erased by exposure to erasing light emitted by erasing light sources 42. The stimulable phosphor sheet, erased and ready for reuse, is next conveyed to the sorter section 50 by the belt 43, the switchback conveyance device 60 and a sixth conveyor 44.

At the sorter 50, the stimulable phosphor sheets are sorted onto shelves 52 by size, whereafter they can be removed from the radiation image read-out and erasing apparatus for reuse.

The successive operations of the switchback conveyance device 60 of the aforesaid radiation image read-out and erasing apparatus are schematically illustrated in the enlarged views shown in FIGS. 2A to 2E. The stimulable phosphor sheet conveyance apparatus according to this invention will now be explained with reference to these figures.

When a stimulable phosphor sheet 80 arrives at the switchback conveyance device 60 from the read-out section 30, it is conveyed upward through a first conveyance path 75 defined between a vertical section of a first belt 43 and a first roller 61 until its leading end comes in contact with a second belt 68. The second belt 68 is driven in the direction of the arrow A by seventh and eighth rollers 69 and 70 so that upon making contact with the second belt 68 the stimulable phosphor sheet 80 is also carried in this direction. As a result, the stimulable phosphor sheet 80 is drawn into a third conveyance path 76 defined between the second belt 68 and a third belt 65 driven in the direction of the arrow A by fifth and sixth rollers 66 and 67 (FIG. 2B).

The fact that the stimulable phosphor sheet has entered the third conveyance path 76 is detected by light sensors 71a and 71b and the second and third belts 68 and 65 are stopped on the basis of the output from these light sensors. Here it should be mentioned that the light sensors 71a, 71b are only one example of means for detecting the entry of the stimulable phosphor sheet 80 into the third conveyance path 76 and that it is alternatively possible to use a timer or any other suitable means for this purpose.

Figure 2A:
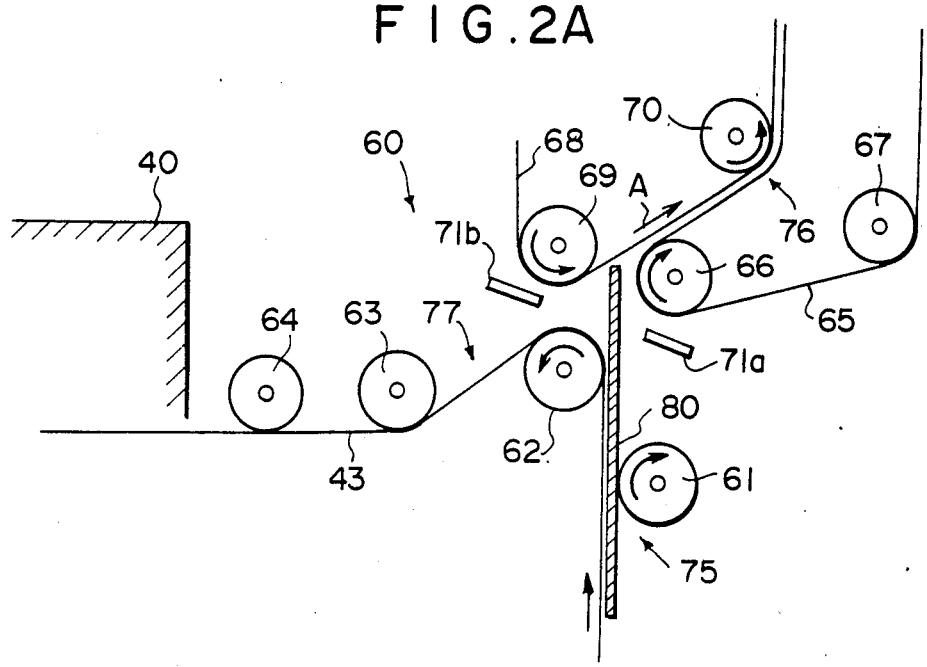
FIGS. 2A to 2E are schematic views showing the successive operations of the embodiment shown in FIG. 1.
Figure 2B:
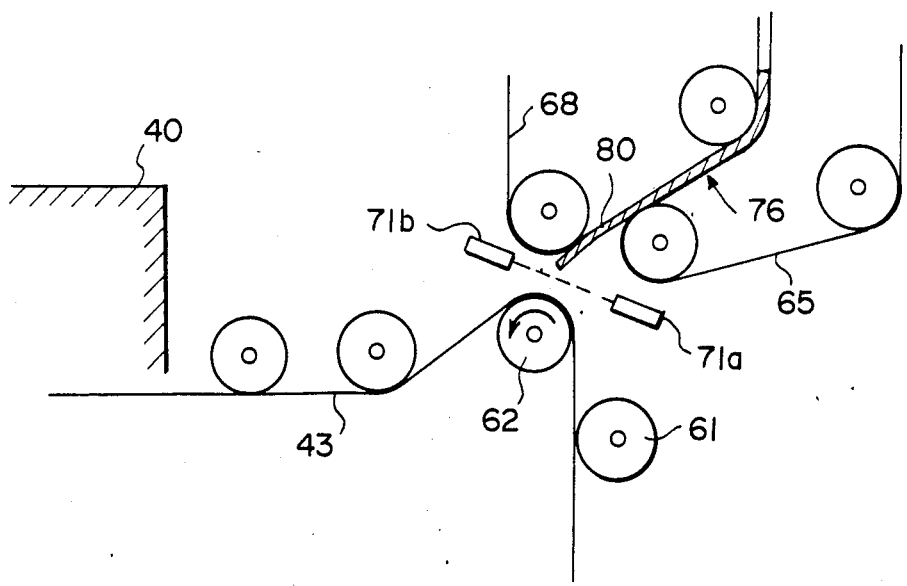
Figure 2C:
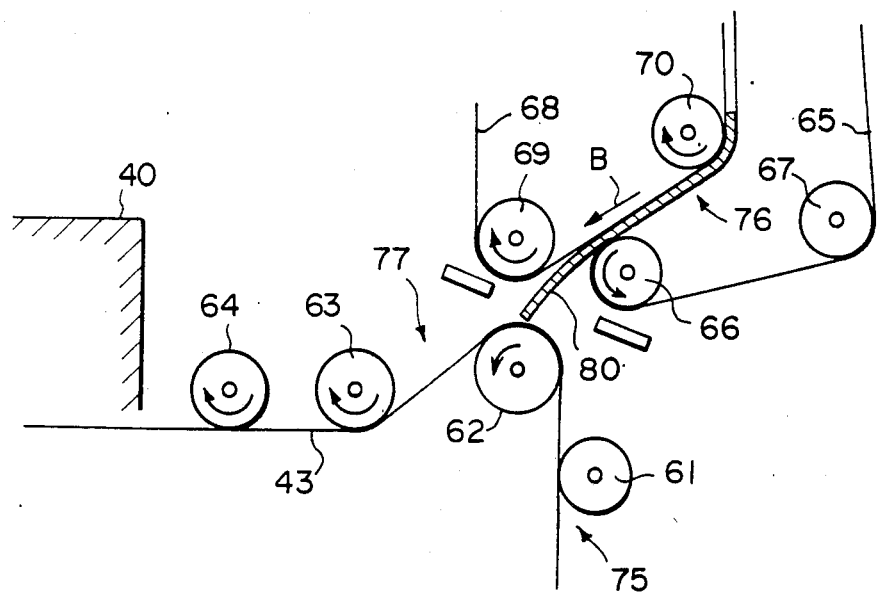

After once stopping the second and third belts 68 and 65, the rollers 66, 67, 69 and 70 are reversely rotated so as to drive these belts in the direction indicated by the arrow B in FIG. 2C, i.e. in the opposite direction from that indicated by the arrow A in FIG. 2A. The stimulable phosphor sheet 80 is thus also conveyed in the direction of the arrow B toward a second conveyance path 77 defined between a generally horizontal section of the first belt 43, a second roller 62 and a third roller 63. As the second conveyance path 77 and the third conveyance path 76 are aligned with each other, the stimulable phosphor sheet 80 conveyed from the third conveyance path 76 smoothly enters the second conveyance path 77. Here, the entry of the stimulable phosphor sheet 80 into the second conveyance path 77 is assured even if, as illustrated in FIG. 2C, the end of the sheet should bend down under its own weight since in such a case the tip of the sheet will be smoothly drawn into the second conveyance path 77 by the rotation of the second roller 62 positioned at the branching point between the first conveyance path 75 and the second conveyance path 77.

Figure 2D:
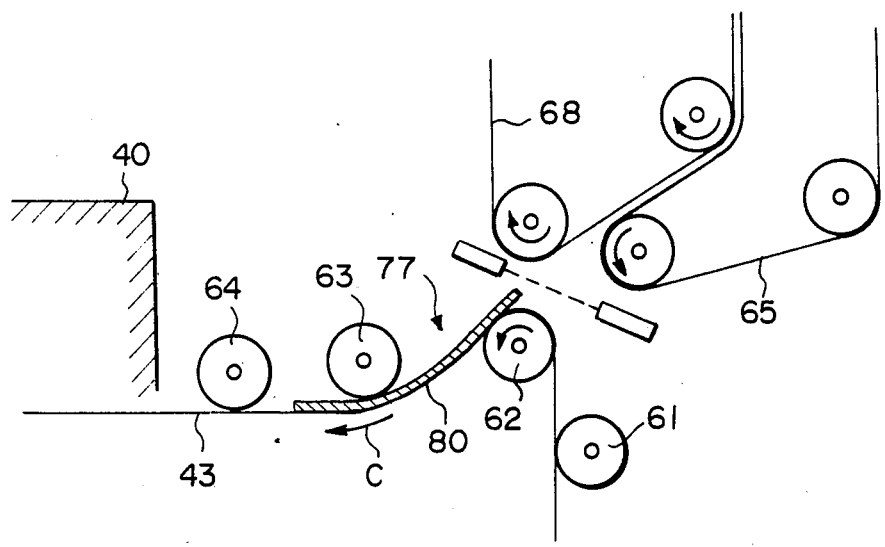
Figure 2E:
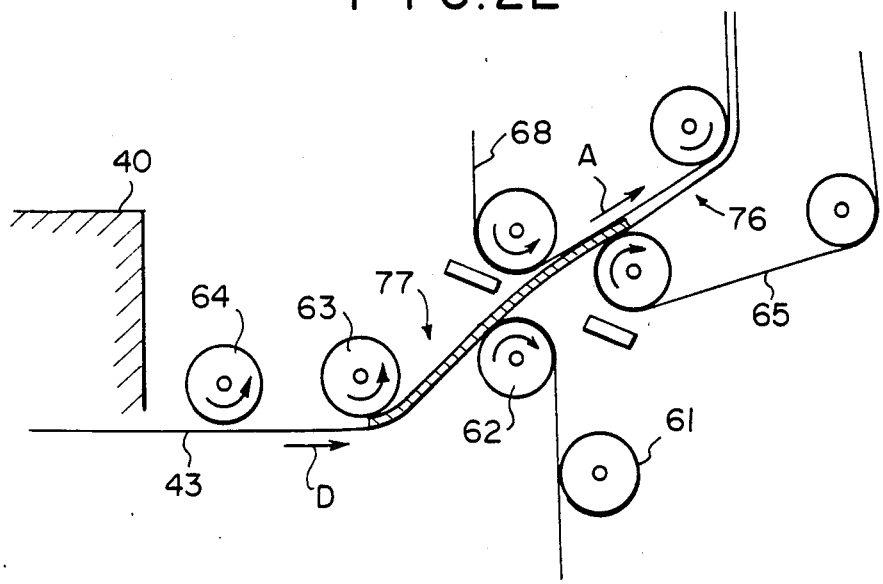

Then, as shown in FIG. 2D, the stimulable phosphor sheet 80 is conveyed through the second conveyance path 77 and into the erasing section 40 by the first belt 43. After the radiation energy remaining on the sheet 80 has been erased by exposure to erasing light emitted by the erasing light sources 42, the sheet 80 is fed in the reverse direction by the first belt 43 so as to travel in the direction indicated by the arrow D in FIG. 2E. It therefore passes through the second conveyance path 77 and back into the third conveyance path 76 which, as mentioned earlier, is aligned therewith. From the third conveyance path 76 the stimulable phosphor sheet 80 is conveyed to the sixth conveyor 44 shown in FIG. 1, which takes it to the sorter section 50.

Thus, in accordance with the aforesaid embodiment, a stimulable phosphor sheet exiting from the read-out section 30 with its stimulable phosphor side facing upward can be conveyed to the erasing section with its stimulable phosphor side still facing upward and then be conveyed back out of the erasing section, simply by means of selective foward and reverse operation of rollers and belts.

Figure 3:
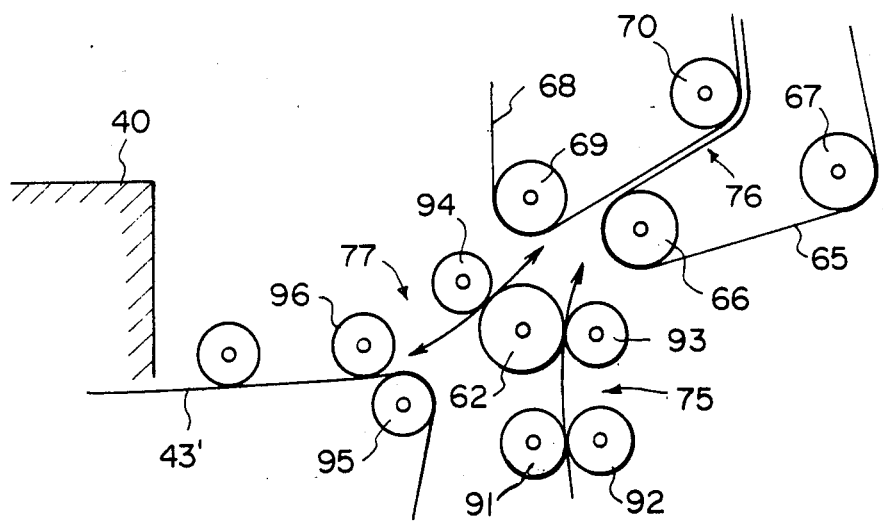
FIG. 3 is a schematic side view of another embodiment of the conveyance apparatus according to this invention.

FIG. 3 schematically illustrates another embodiment of the switchback conveyance device according to this invention. In this embodiment, the first conveyance path 75 is defined by a pair of rollers 91, 92 and another pair of rollers 62, 93 positioned above the first said pair of rollers, and the second conveyance path 77 is defined by a pair of rollers 62, 94 and another pair of rollers 95, 96. In this arrangement, too, the roller 62 is positioned at the branching point between the first conveyance path 75 and the second conveyance path 77. This embodiment also operates as illustrated in FIGS. 2A to 2E, making it possible to convey the stimulable phosphor sheet to the erasing section with its stimulable phosphor side facing upward and then to convey it back out of the erasing section. Since this operation is identical to that described above with reference to FIGS. 2A to 2E, no further description will be given here.

I claim:

1. A stimulable phosphor sheet conveyance apparatus having a first conveyance path for receiving a stimulable phosphor sheet subjected to image read-out in an image read-out section and conveying the stimulable phosphor sheet in the forward direction; a third conveyance path for receiving the stimulable phosphor sheet conveyed by said first conveyance path and then conveying it in the reverse direction; a second conveyance path for receiving the stimulable phosphor sheet conveyed in the reverse direction by the third conveyance path, conveying the stimulable phosphor sheet in the same direction to an erasing section in such orientation that the stimulable phosphor side of the stimulable phosphor sheet faces erasing light sources provided in the erasing section, and, after the radiation energy remaining on the stimulable phosphor sheet has been released in said erasing section, conveying the stimulable phosphor sheet in the forward direction to return it to the third conveyance path; wherein the improvement comprises positioning a roller for conveying the stimulable phosphor sheet at the branching point between the first conveyance path and the second conveyance path, providing the third conveyance path with a belt for guiding the stimulable phosphor sheet received from the first conveyance path to the third conveyance path, and positioning the third conveyance path to lie approximately on an imaginary straight-line extension of the second conveyance path.

2. An apparatus as defined in claim 1 wherein said first conveyance path is defined by a belt and at least one roller, said second conveyance path is defined by a belt and at least one roller, and said third conveyance path is defined by two belts.

3. An apparatus as defined in claim 2 wherein the belt defining said first conveyance path and the belt defining said second conveyance path are respectively a substantially vertical section and a substantially horizontal section of the same belt.

4. An apparatus as defined in claim 1 wherein said first conveyance path is defined by at least two pairs of rollers, said second conveyance path is defined by at least two pairs of rollers and said third conveyance path is defined by two belts.

5. An apparatus as defined in claim 4 wherein said roller provided at the branching point between said first conveyance path and said second branching path also serves as as one member of said at least two pairs of rollers defining said first conveyance path and as one member of said at least two pairs of rollers defining said second conveyance path.

6. An apparatus as defined in claim 1 further provided with detecting means for detecting the entry of the stimulable phosphor sheet into said third conveyance path.

7. An apparatus as defined in claim 6 wherein said detecting means is at least one light sensor.

8. An apparatus as defined in claim 6 wherein said detecting means is a timer.

* * * * *